US012679499B2

(12) United States Patent
Koetz et al.

(10) Patent No.: US 12,679,499 B2
(45) Date of Patent: Jul. 14, 2026

(54) ELECTRIC DRIVE DEVICE FOR A BICYCLE

(71) Applicant: Mahle International GmbH, Stuttgart (DE)

(72) Inventors: Christian Koetz, Dresden (DE); Matthias Koop, Neufahrn (DE); Christian Wirth, Mossinning (DE)

(73) Assignee: Mahle International GmbH (DE)

( * ) Notice: Subject to any disclaimer, the term of this patent is extended or adjusted under 35 U.S.C. 154(b) by 996 days.

(21) Appl. No.: 17/894,152

(22) Filed: Aug. 23, 2022

(65) Prior Publication Data

US 2023/0061633 A1     Mar. 2, 2023

(30) Foreign Application Priority Data

Aug. 24, 2021    (DE) ..................... 10 2021 209 279.9

(51) Int. Cl.
B62M 6/55          (2010.01)
(52) U.S. Cl.
CPC ..................................... B62M 6/55 (2013.01)
(58) Field of Classification Search
CPC ........ B62M 6/55; B62M 11/14; B62M 11/145
See application file for complete search history.

(56) References Cited

U.S. PATENT DOCUMENTS

| | | | |
|---|---|---|---|
| 10,137,961 B2 | 11/2018 | Yamamoto | |
| 2015/0101874 A1* | 4/2015 | Getta ...................... | B62M 11/02 180/206.4 |
| 2017/0274963 A1* | 9/2017 | Yamamoto .............. | F16H 3/727 |

FOREIGN PATENT DOCUMENTS

| | | |
|---|---|---|
| DE | 102014009833 A1 | 1/2016 |
| DE | 102016121861 A1 | 6/2017 |
| DE | 112015005797 T5 | 9/2017 |
| DE | 102016014410 B3 | 1/2018 |
| EP | 1132287 A2 | 9/2001 |
| EP | 2218634 A1 | 8/2010 |
| EP | 2818393 A1 | 12/2014 |
| EP | 2900547 A1 | 8/2015 |
| EP | 3012181 A1 | 4/2016 |
| EP | 3165438 A1 | 5/2017 |
| EP | 3287355 A1 | 2/2018 |
| EP | 3655316 A1 | 5/2020 |
| EP | 3689730 A2 | 8/2020 |
| WO | 2014047747 A1 | 4/2014 |
| WO | 2016000809 A1 | 1/2016 |
| WO | 2018215346 A1 | 11/2018 |
| WO | 2019015811 A1 | 1/2019 |

OTHER PUBLICATIONS

German search report for DE-102021209279.9, dated Mar. 3, 2022.

* cited by examiner

*Primary Examiner* — Christopher B Wehrly
(74) *Attorney, Agent, or Firm* — Fishman Stewart PLLC

(57)          ABSTRACT

A drive device for a bicycle is disclosed. The drive device includes an electric motor comprising a motor shaft, a driven shaft, and a planetary gear set that drive-connects the motor shaft with the drive shaft. The planetary gear set includes a sun gear, at least two planetary gears, an internal gear, and a planet gear carrier, on which the at least two planet gears are rotatably mounted. The sun gear, the internal gear, and the planet gear carrier are rotatably mounted in the planetary gear set about a common axis of rotation.

20 Claims, 4 Drawing Sheets

ELECTRIC DRIVE DEVICE FOR A BICYCLE

CROSS-REFERENCE TO RELATED APPLICATION

This application claims priority to German Application No. DE 10 2021 209 279.9 filed on Aug. 24, 2021, the contents of which are hereby incorporated by reference in its entirety.

TECHNICAL FIELD

The present invention relates to an electric drive device for the assisted driving of a bicycle, which comprises an electric motor and a planetary gear set for transmitting the drive to a traction mechanism drive of the associated bicycle. Further, the invention relates to a bicycle having such a drive device.

BACKGROUND

It is known to drive a bicycle in an electrically assisted manner. When such an electrically assisted drive is provided, the bicycle is usually referred to as "E-Bike" or "Pedelec".

For the assisted driving of the bicycle, an electric drive device is usually employed which includes an electric motor. Transmitting the torque generated by the electric motor to a traction mechanism drive of the bicycle is usually effected via a gearing. The gearing can include a planetary gear set.

Such a drive device for a bicycle is known from WO 2018/215346 A1. The drive device includes an electric motor with a motor shaft and a driven shaft for coupling to a traction mechanism drive of the associated bicycle. Further, the drive device includes a planetary gear set which drive-connects the motor shaft with the driven shaft. Here, the planetary gear set includes a sun gear, at least two planet gears and an internal gear. In addition, the planetary gear set includes two output gears which are in engagement with a driven gear wheel non-rotatably mounted to the driven shaft, thus driving the same during operation.

The present invention deals with the object of stating improved or at least other embodiments for a bicycle of the type mentioned above and for a bicycle having such a drive device, which are characterised by an improved drive transmission and/or a cost-effective and/or a compact realisation.

According to the invention, this object is solved through the subjects of the independent claim(s). Advantageous embodiments are subject of the dependent claims.

SUMMARY

The present invention is based on the general idea of equipping an electric drive device for the assisted driving of a bicycle with an electric motor and a planetary gear set and rotatably mounting rotating components of the planetary gear set about a common axis, which in the following is also referred to as axis of rotation. The result is a more compact design of the planetary gear set and thus of the entire drive device. Further, the planetary gear set, with such a design of the drive device, can transmit the drive power of the electric motor in a simple and distributed manner and consequently better to a driven shaft of the drive device. As a consequence, the drive device can be produced cost-effectively and in a compact manner, wherein at the same time the parts of the drive device, in particular of the planetary gear set, can be produced from materials which result in a reduced noise development and a reliable drive transmission.

According to the inventive idea, the drive device includes the electric motor, which comprises a motor shaft. In addition, the drive device includes a driven shaft via which a drive torque is transmitted to the bicycle. For this purpose, the driven shaft can be coupled to a traction mechanism drive of the associated bicycle. The drive device, further, comprises the planetary gear set which drive-connects the motor shaft with the driven shaft. The planetary gear set comprises a sun gear, which is drive-connected with the motor shaft, at least two planet gears which are in engagement with the sun gear and an internal gear that is in engagement with the planet gears. In addition, the planetary gear set comprises a carrier on which the planet gears are rotatably mounted. The sun gear, the planet gears and the internal gear are rotatably mounted in the planetary gear set. According to the invention it is provided, further, that the sun gear, the planet gear carrier and the internal gear are rotatably mounted in the planetary gear set about the common axis, which in the following is also referred to as axis of rotation.

The traction mechanism drive of the associated bicycle is for example a belt drive, a chain drive or pedal crank of the bicycle. The traction mechanism drive can be coupled to the driven shaft, but the driven shaft decoupled from the traction mechanism drive, for example by means of at least one freewheel.

Advantageously, the sun gear is non-rotatably connected to the motor shaft by means of a gear wheel and thus drive-connected with the motor shaft. Practically, the gear wheel, in the following, also referred to as input gear wheel, is non-rotatably provided on the sun gear and can be in engagement with a gear wheel non-rotatably provided on the motor shaft, in the following also referred to as drive gear wheel.

For transmitting the drive torque to the driven shaft, the planetary gear set can basically be configured in any way.

It is conceivable, in particular, that the planetary gear set comprises at least one driven gear that is non-rotatably connected to the driven shaft.

In preferred embodiments, the axis of rotation is formed by a pin that is fixed and firm in the planetary gear set, which in the following is also referred to as axle pin. The axle pin can be fixed for example on a housing of the drive device. Thus, the planetary gear set comprises the axle pin. The axle pin extends coaxially to the common axis of rotation and forms the axis of rotation. Here, the sun gear, the planet gears and the internal gear are each at least indirectly, i.e. either directly or indirectly, rotatably mounted about the axis of rotation on the axle pin. This results in a simplified and more compact construction of the planetary gear set and thus of the drive.

In advantageous embodiments, the sun gear is rotatably mounted directly on the axle pin via at least one bearing, in the following also referred to as sun gear bearing. The at least one sun gear bearing is arranged for this purpose between the axle pin and the sun gear.

It is conceivable that at least one of the at least one sun gear bearings is radially arranged between the input gear wheel and the axle pin. The rotatable mounting of the sun gear can thus take place by means of the input gear wheel.

Here it is conceivable to provide two such sun gear bearings which are axially spaced apart from one another.

Preferred are embodiments, in which the planetary gear set drives the driven shaft via at least one shaft, which in the following is also referred to as drive shaft, i.e. is drive-connected with the driven shaft. Practically, the at least one drive shaft is separate from the axle pin.

Practically, the at least one drive shaft is rotatably mounted about the common axis of rotation.

It is conceivable that the planetary gear set comprises a first drive shaft which is provided with a non-rotatable output gear wheel, wherein the output gear wheel in the following is also referred to as first output gear wheel. With the first output gear wheel, the driven shaft is driven. Accordingly, the first output gear wheel is drive-connected with the driven shaft. Here, the first drive shaft is rotatably mounted about the common axis of rotation via a bearing, which in the following is also referred to as first output gear wheel bearing.

Preferably, the first output gear wheel bearing is radially arranged between the axle pin and the first output gear wheel, so that the first drive shaft, via the first output gear wheel, is rotatably mounted about the axis of rotation directly on the axle pin.

For drive-connecting the first output gear wheel with the driven shaft, a driven gear wheel can be non-rotatably provided on the driven shaft, wherein the driven gear wheel can be in engagement with the first output gear wheel.

Preferred are embodiments, in which the planet gear carrier is part of the first drive shaft. This means that the first drive shaft includes the planet gear carrier so that the planet gear carrier is non-rotatably connected with the first output gear wheel.

Basically, the first drive shaft can be rotatably mounted about the axis of rotation exclusively via the first output gear wheel and thus via the first output gear wheel bearing.

Preferred are embodiments, in which the first drive shaft is alternatively or additionally, advantageously additionally, rotatably mounted about the axis of rotation via the planet gear carrier. For this purpose, the planetary gear set comprises a bearing that is advantageously axially spaced apart from the first output gear wheel bearing, which in the following is also referred to as carrier bearing. Thus, the first drive shaft is rotatably mounted about the axis of rotation by means of the carrier bearing via the planet gear carrier.

Here it is preferred when the planet gear carrier is rotatably mounted directly on the axle pin. In particular, the planet gear carrier is rotatably mounted about the axis of rotation on the sun gear and/or on the input gear wheel. For this purpose, the carrier bearing is arranged radially between the planet gear carrier and the sun gear and/or the input gear wheel.

Preferably, the planetary gear set comprises a further drive shaft which in the following is also referred to as second drive shaft. The second drive shaft is drive-connected with the driven shaft. For this purpose, the second driven shaft comprises an output gear wheel which in the following is also referred to as second output gear wheel. Thus, the second output gear wheel is drive-connected with the driven shaft. Preferably, the first output gear wheel of the first drive shaft and the second output gear wheel of the second drive shaft are arranged axially offset and spaced apart from one another.

Advantageously, the second drive shaft is rotatably mounted about the axis of rotation, in particular at least indirectly on the axle pin, by means of a bearing via the second output gear wheel, which in the following is also referred to as second output gear wheel bearing.

Preferably, the second drive shaft is rotatably mounted about the axis of rotation and thus indirectly on the axle pin by means of the second output gear wheel bearing. For this purpose, the second output gear wheel bearing is advantageously arranged radially between the first drive shaft and the second output gear wheel.

The drive connection between the second output gear wheel and the driven shaft can basically be realised in any way.

Advantageously, the second output gear wheel for this purpose is in engagement with the driven gear or a further driven gear, which is non-rotatably provided on the driven shaft.

Embodiments are considered advantageous in which the second drive shaft includes the internal gear, so that the internal gear is non-rotatably connected with the second output gear wheel.

In preferred embodiments, the internal gear and the second output gear wheel are formed integrally. This results in a simple and compact construction of the planetary gear set and thus in a simple and compact design of the drive device.

Embodiments, in which the second output gear is case-hardened and the internal gear is subsequently injection moulded onto the case-hardened second output gear are considered preferable. Besides a compact construction, this results in a reliable drive torque transmission and a reduced noise development.

In preferred embodiments, the second output gear wheel bearing is received in the second output gear wheel. Here, the second output gear wheel comprises a shoulder directed radially to the inside, which is advantageously arranged on the second output gear wheel axially outside, so that the shoulder axially positions the second output gear wheel bearing in the planetary gear set.

This means that the second output gear wheel bearing axially butts up against the shoulder. Thus, a simplified axial mounting with compact construction at the same time is achieved.

Alternatively or additionally it is conceivable that the second output gear wheel bearing axially butts up against the first drive shaft.

Practically, the respective planet gear is rotatably mounted in the planet gear carrier via at least one associated bearing each, which in the following is also referred to as planet gear bearing. The respective planet gear is rotatable about an associated rotational axis radially offset from the axis of rotation.

Practically, the motor shaft, further, is rotatably mounted, via at least one bearing, about a motor axis that is radially offset from the axis of rotation.

It is to be understood that beside the drive device a bicycle having such a drive device is also part of the scope of this invention.

Here, the bicycle comprises a pedal crank and a traction mechanism drive, for example, a chain drive or a belt drive, wherein the drive device is coupled or can be coupled to the traction mechanism drive by means of the driven shaft.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
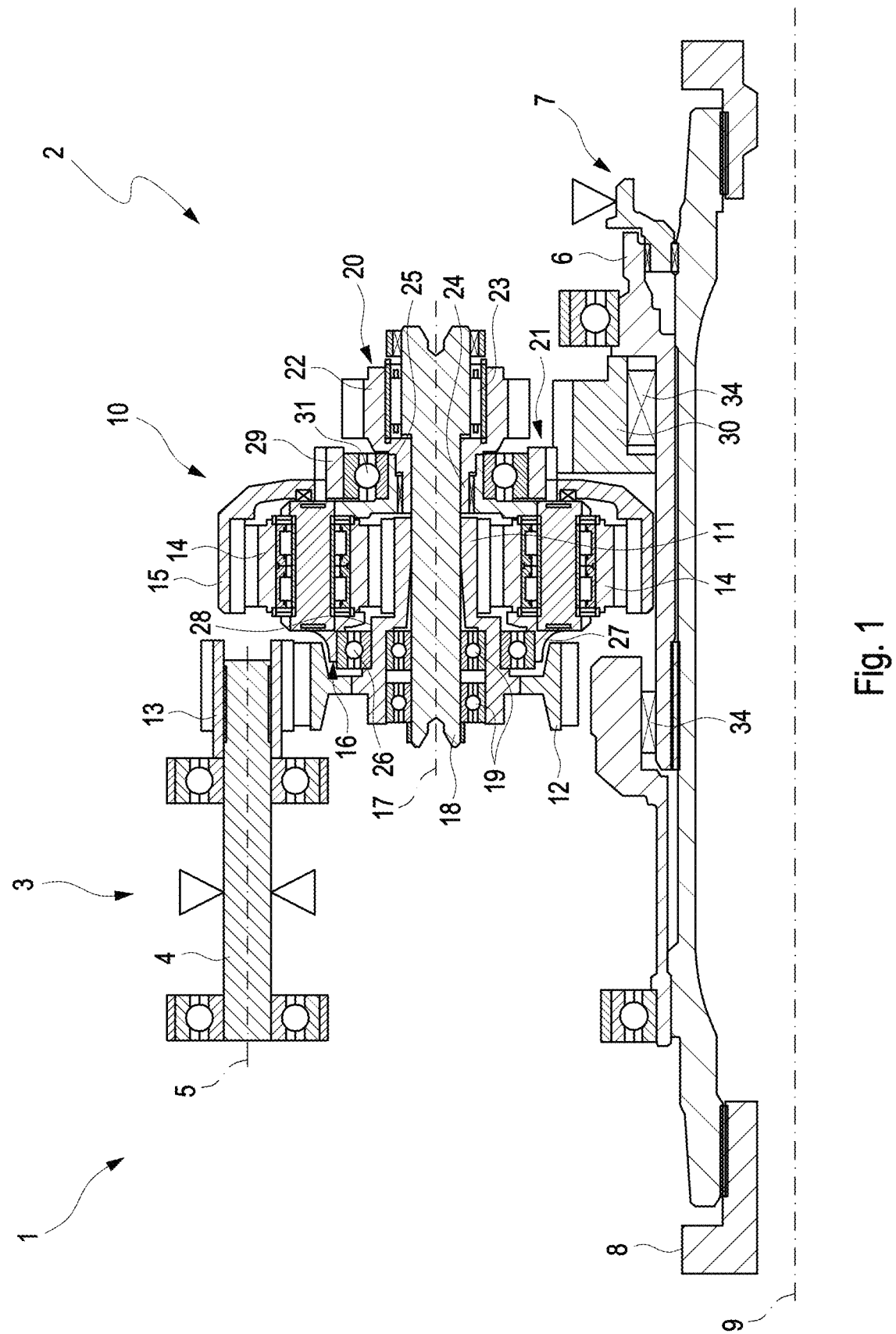
FIG. 1 a greatly simplified section through a drive device with a planetary gear set for a bicycle, FIG. 2 a section through the bicycle in the region of the drive device in the other exemplary embodiment, FIG. 3 a section through the planetary gear set of the drive device from FIG. 2, FIG. 4 an isometric view of a component of the planetary gear set from FIG. 3, FIG. 5 another isometric view of the component.
Figure 2:
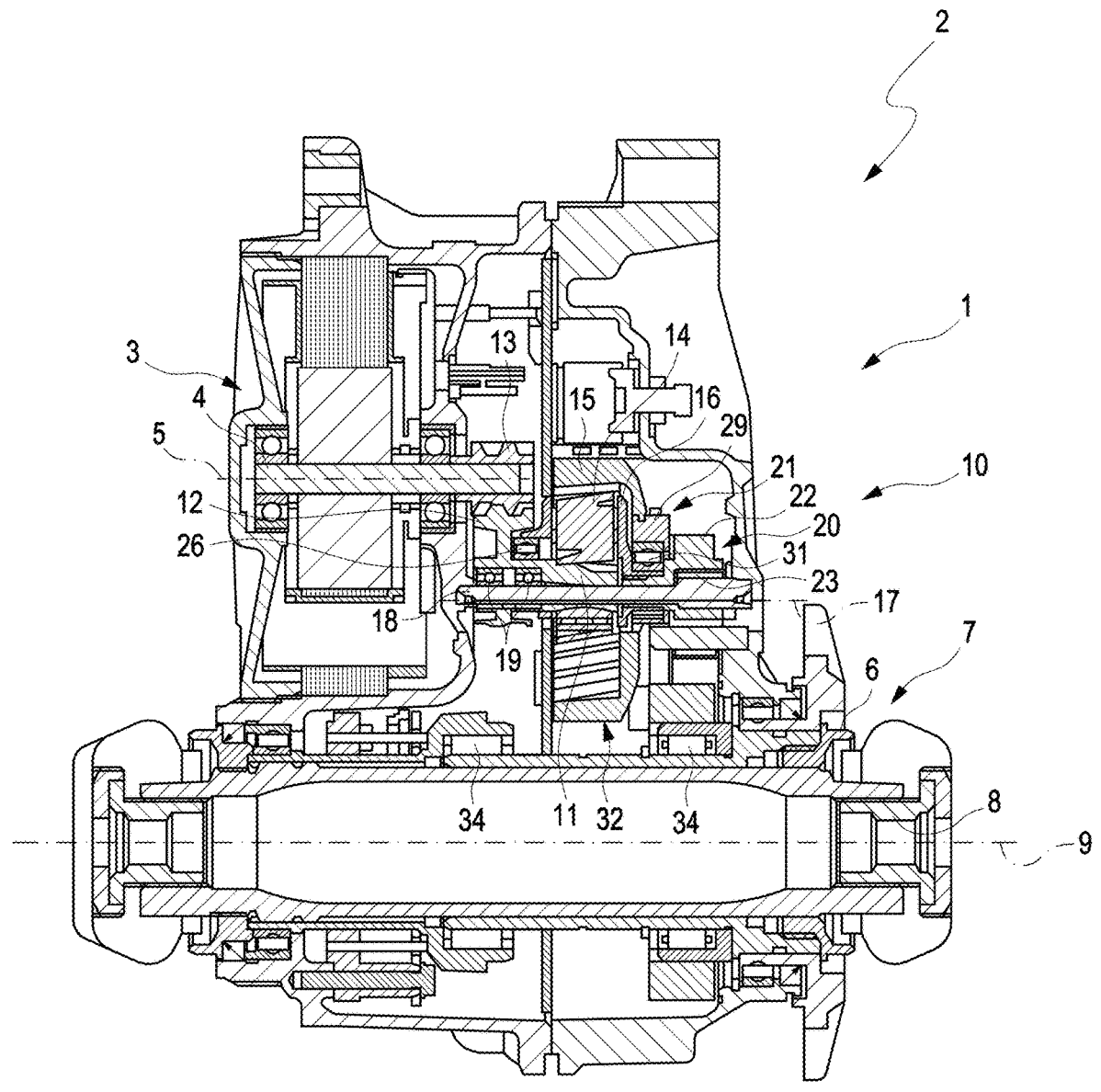
Figure 3:
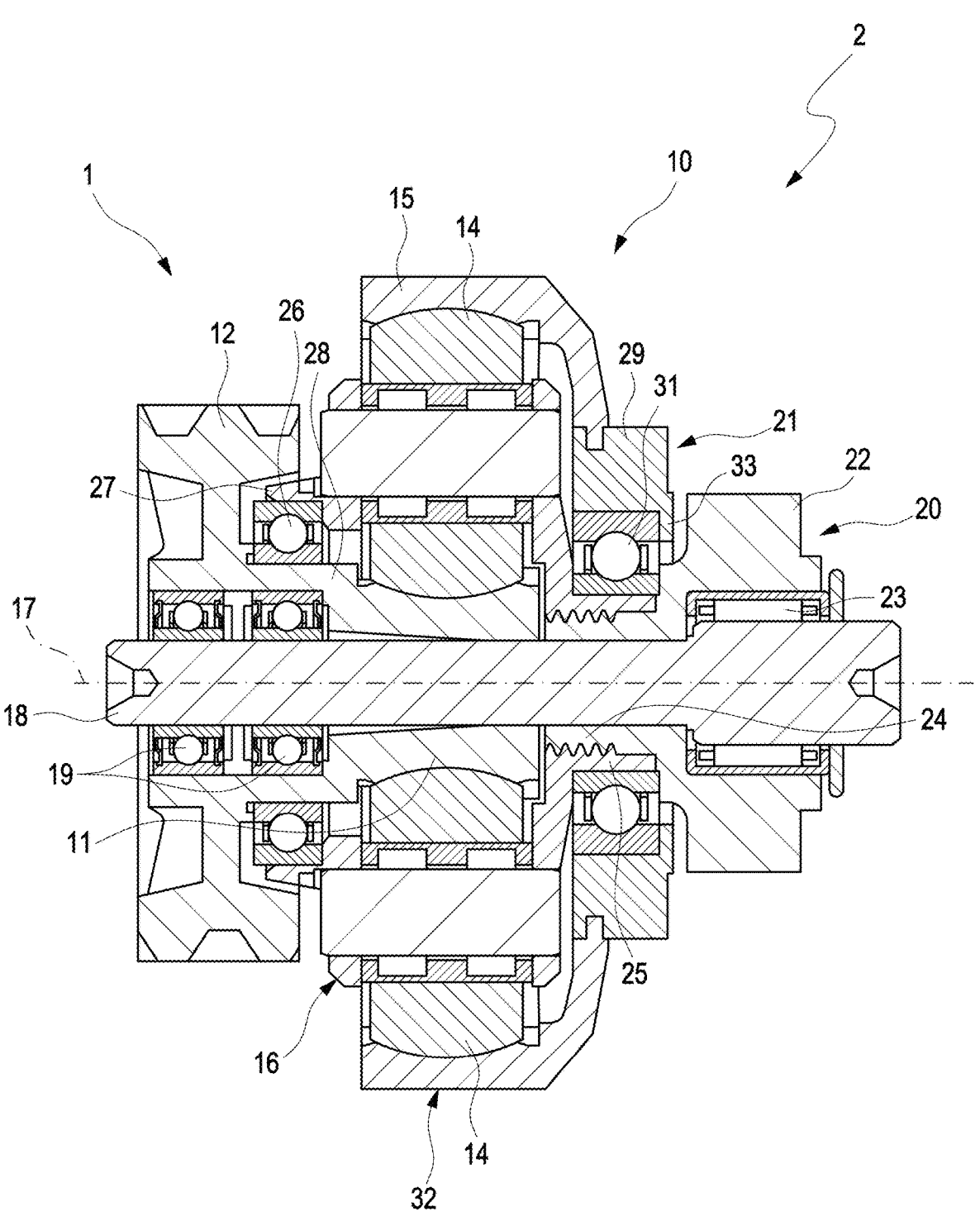

A drive device 1, such as is shown for example in the FIGS. 1 to 3, is employed for the assisted driving of a bicycle 2 indicated in the FIGS. 1 and 2. For the assisted driving of the bicycle 2, the drive device 1 comprises an electric motor 3 which comprises a motor shaft 4. The motor shaft 4 is connected with a rotor of the electric motor 3 which is not referred to in more detail or corresponds to the said rotor. In FIG. 1, merely the motor shaft 4 of the electric motor 3 is visible. In FIG. 3, the electric motor 3 is not shown. Thus, the motor shaft 4 rotates during operation about a motor axis 5 indicated in dashed line in the FIGS. 1 and 2. The drive device 1 further includes a driven shaft 6, which for the assisted driving of the bicycle 2 is coupled to a traction mechanism drive 7 of the bicycle 2. In the exemplary embodiments shown in the FIGS. 1 and 2, the driven shaft 6 is non-rotatably connected to a pedal crank 8 of the bicycle 2. Accordingly, the driven shaft 6 and the pedal crank 8 rotate about a common axis 9, which in the following is also referred to as pedal crank axis 9. The pedal crank axis 9 and the motor axis 5 are arranged radially offset from one another with respect to the axes 5, 9. The drive device 1, further, comprises a planetary gear set 10 which drive-wise connects and thus drive-connects the motor shaft 4 with the driven shaft 6. Here, the driven shaft 6 in the shown exemplary embodiments is coupled with the planetary gear set 10 via at least one freewheel 34 in such a manner that the driven shaft 6, when pedalling the pedal crank 8, is drive-connected with the planetary gear set 10 and in the absence of pedalling, is decoupled from the planetary gear set 10. As a consequence, a torque generated by means of the electric motor 6 is transmitted via the planetary gear set 10 during pedalling to the driven shaft 6 and consequently to the traction mechanism drive 7, in the shown exemplary embodiments to the pedal crank 8.

As is evident in particular from FIG. 1, the planetary gear set 10 comprises a sun gear 11 that is drive-connected with the motor shaft 4. In the shown exemplary embodiments, the sun gear 11 for this purpose is non-rotatably connected with an input gear wheel 12 of the planetary gear set 10, which is in engagement with a drive gear wheel 13 non-rotatably mounted on the motor shaft 4. As is evident for example from the FIGS. 2 and 3, the sun gear 11 and the input gear wheel 12 can be produced integrally. The planetary gear set 10, further, comprises at least two planet gears 14, which with respect to the sun gear 11 are arranged radially outside and are in engagement with the sun gear 11. The planet gears 14 in turn are in engagement with an internal gear 15 surrounding the former circumferentially. The planet gears

14 are each rotatably held and mounted by a carrier 16, wherein the carrier 16 in the following is also referred to as planet gear carrier 16.

As is evident from the FIGS. 1 to 3, the sun gear 11, the internal gear 15 and the planet gear carrier 16 are each rotatably mounted about a common axis of rotation 17 in the planetary gear set 10. Thus it is possible in particular to employ each of the mentioned parts of the planetary gear set 10 for driving the driven shaft 6 and thus for the assisted driving of the bicycle 2.

In the shown exemplary embodiments, the rotatable mounting about the common axis of rotation 17 takes place by means of a pin 18 fixed in the planetary gear set 10, which in the following is also referred to as axle pin 18. The axle pin 18 extends coaxially to the common axis of rotation 17 and forms the axis of rotation 17, wherein the axle pin 18 corresponds to a fixed axle in the planetary gear set 10. In the shown exemplary embodiments, the sun gear 11, the internal gear 15 and the planet gear carrier 16 are each at least rotatably mounted indirectly about the common axis of rotation 17 on the axle pin 18.

In the shown exemplary embodiments, the mounting of the sun gear 11 is effected by means of at least one bearing 19 directly on the axle pin 18, wherein the bearing 19 in the following is also referred to as sun gear bearing 19. In the shown exemplary embodiments, the at least one sun gear bearing 19 is arranged radially between the input gear wheel 12 and the axle pin 18 and thus mounts the input gear wheel 12 and consequently the sun gear 11 that is non-rotatably connected to the input gear wheel 12 about the axis of rotation 17 directly on the axle pin 18. As is evident in particular from FIG. 1, two such sun gear bearings 19 are provided in the shown exemplary embodiments, which are axially spaced apart from one another.

For driving the driven shaft 6, the planetary gear set 10 in the shown exemplary embodiments comprises two drive shafts 20, 21, namely a first drive shaft 20 and a second drive shaft 21.

The first drive shaft 20 is provided with a non-rotatable output gear wheel 22, which in the following is also referred to as first output gear wheel 22. The first output gear wheel 22 serves for driving the driven shaft 6 by means of the first drive shaft 20. Accordingly, the first output gear wheel 22 is drive-connected with the driven shaft 6 (not shown). As is evident in particular from FIG. 1, the first drive shaft 20 in the shown exemplary embodiments is rotatably mounted about the axis of rotation directly on the axle pin 18 by way of the first output gear wheel 22 by means of a bearing 23. The bearing 23, which in the following is also referred to as first output gear wheel bearing 23, is radially arranged between the first output gear wheel 22 and the axle pin 18 and thus rotatably mounts the first output gear wheel 22 and consequently the first drive shaft 20 about the axis of rotation 17 directly on the axle pin 18. As is evident, further, in particular from FIG. 1, the first drive shaft 20 in the shown exemplary embodiments further includes the planet gear carrier 16. This means that the planet gear carrier 16 is part of the first drive shaft 20 and thus non-rotatably connected to the first output gear wheel 22. For this purpose, the first drive shaft 20 in the shown exemplary embodiments comprises an extension 24 axially projecting from the first output gear wheel 22 in the direction of the planet gear carrier 16, which extension in the following is also referred to as first extension 24. In addition, the planet gear carrier 16 comprises an extension 25 axially projecting in the direction of the first output gear wheel 22, which in the following is also referred to as second extension 25. In the shown exemplary embodiments, the first extension 24 is radially arranged between the axle pin 18 and the second extension 25. In the exemplary embodiment of FIG. 1, the extensions 24, 25 are in engagement with one another. In the exemplary embodiments of the FIGS. 2 and 3, the extensions 24, 25 are screwed to one another. Further, an axial positioning of the planet gear carrier 16 in the planetary gear set 10 further takes place by way of the extensions 24, 25.

As is evident in particular from FIG. 1, the first drive shaft 20, further, is rotatably mounted about the axis of rotation 17 indirectly on the axle pin 18 via the planet gear carrier 16 by means of a bearing 26. The bearing 26, in the following also referred to as carrier bearing 26, is radially arranged between a projection 27 axially projecting from the planet gear carrier 16 and an axially-extending support surface 28 of the sun gear 11. Thus, the carrier bearing 26 rotatably mounts the planet gear carrier 16 and consequently the first drive shaft 20 on the sun gear 19 about the common axis of rotation 17 and consequently indirectly on the axle pin 18.

As is evident in particular from FIG. 1, the second drive shaft 21 in the shown exemplary embodiments comprises an output gear wheel 29, in the following also referred to as second output gear wheel 29, via which the second drive shaft 21 is drive-connected with the driven shaft 6. As is evident from FIG. 1, the driven shaft 6 in the shown exemplary embodiments is connected for this purpose via a freewheel 34 with a driven gear wheel 30, which is in engagement with the second output gear wheel 29. As is evident in particular from FIG. 1, the first output gear wheel 22 and the second output gear wheel 29 are axially offset from one another. As is evident, further, for example from FIG. 1, the second drive shaft 21 in the shown exemplary embodiments is rotatably mounted about the common axis of rotation 17 indirectly on the axle pin 18 via the second output gear wheel 29. For this purpose, a bearing 31, in the following also referred to as second output gear wheel bearing 31, is radially arranged between the second output gear wheel 29 and the second extension 25. The second output gear wheel bearing 31 thus rotatably mounts the second output gear wheel 29 and consequently the second driven shaft 21 about the axis of rotation 17 on the second extension 25 and thus on the first drive shaft 20 and consequently indirectly on the axle pin 18.

As is evident for example from FIG. 1, the second drive shaft 21 in the shown exemplary embodiments includes the internal gear 15. For this purpose, the second drive wheel 29 and the internal gear 15 are non-rotatable. In the exemplary embodiment of FIG. 1, the second output gear wheel 29 and the internal gear 15 are non-rotatably connected to one another.

Figure 4:
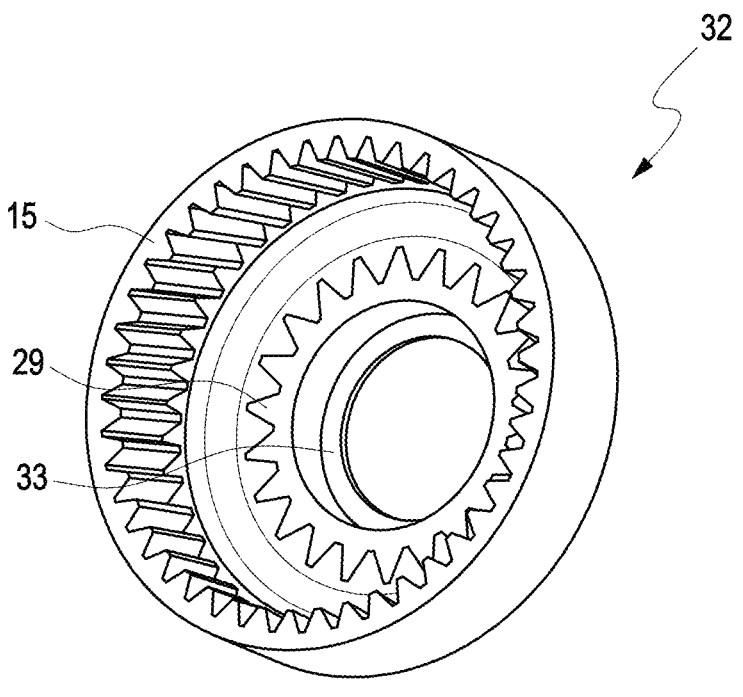
Figure 5:
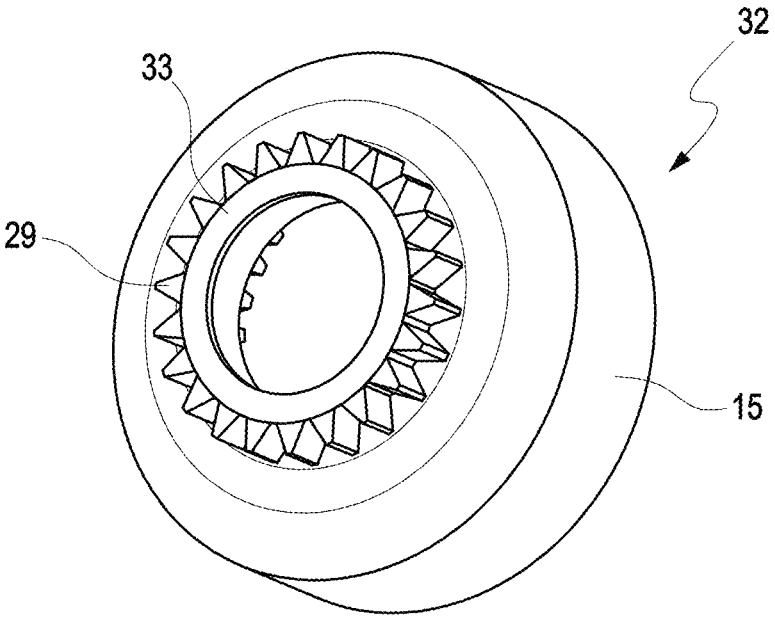

In the exemplary embodiments shown in the FIGS. 2 and 3, the internal gear 15 and the second output gear wheel 29 are integral and thus form a component 32 which is shown separately in the FIGS. 4 and 5. In the shown exemplary embodiment, the second output gear wheel 29 is case-hardened, wherein the internal gear 15 is injection-moulded onto the case-hardened second output gear wheel 29.

As is evident in particular from the FIGS. 3 to 5, the second output gear wheel 29 in this exemplary embodiment comprises a shoulder 33 projecting radially to the inside. The second output gear wheel bearing 31 arranged between the second output gear wheel 29 and the second extension 25 butts up axially against the shoulder 33 and is thus axially positioned and mounted in the planetary gear set 10. In the shown exemplary embodiments, the second output gear wheel bearing 31, further, axially butts up against the first output gear wheel 22 and is thus axially positioned and mounted on both sides in the planetary gear set 10.

The invention claimed is:

1. A drive device for a bicycle, comprising:
   an electric motor comprising a motor shaft,
   a driven shaft for coupling to a traction mechanism drive,
   a planetary gear set that drive-connects the motor shaft with the driven shaft,
   the planetary gear set including a sun gear that is drive-connected with the motor shaft, at least two planet gears that are in engagement with the sun gear, and an internal gear that is in engagement with the at least two planet gears,
   the planetary gear set further including a planet gear carrier, on which the at least two planet gears are rotatably mounted,
   wherein the sun gear, the internal gear and the planet gear carrier are rotatably mounted in the planetary gear set about a common axis of rotation,
   the planetary gear set further including a first drive shaft that is provided with a non-rotatable first output gear wheel,
   the first output gear wheel is drive-connected with the driven shaft,
   the first drive shaft is rotatably mounted about the common axis of rotation via a first output gear wheel bearing arranged radially between a fixed axle pin that extends coaxially to the common axis of rotation and the first output gear wheel, so that the first output gear wheel bearing rotatably mounts the first drive shaft directly on the fixed axle pin,
   the first drive shaft includes the planet gear carrier, so that the planet gear carrier is non-rotatably connected to the first output gear wheel, and
   a carrier bearing rotatably mounts the first drive shaft via the planet gear carrier about the common axis of rotation on the sun gear.

2. The drive device according to claim 1, wherein the sun gear, the internal gear and the planet gear carrier are at least indirectly rotatably mounted about the common axis of rotation on the fixed axle pin.

3. The drive device according to claim 2, wherein:
   the sun gear is rotatably mounted about the common axis of rotation on the fixed axle pin via at least one sun gear bearing, and
   the at least one sun gear bearing mounts the sun gear directly on the fixed axle pin.

4. The drive device according to claim 1, wherein:
   the planetary gear set further comprises a second drive shaft that is provided with a second output gear wheel that is non-rotatable and axially offset from the first output gear wheel,
   the second output gear wheel is drive-connected with the driven shaft, and
   the second drive shaft is rotatably mounted about the common axis of rotation via a second output gear wheel bearing arranged radially between the first drive shaft and the second output gear wheel, so that the second drive shaft is rotatably mounted about the common axis of rotation on the first drive shaft.

5. The drive device according to claim 4, wherein the second drive shaft includes the internal gear, so that the internal gear is non-rotatably connected to the second output gear wheel.

6. The drive device according to claim 5, wherein:
   the internal gear and the second output gear wheel are structured integrally, and the second output gear wheel is case-hardened and the internal gear is injection-moulded to the case-hardened second output gear wheel.

7. The drive device according to claim 4, wherein:
the second output gear wheel comprises a shoulder directed radially to an inside,
the second output gear wheel bearing is received in the second output gear wheel and axially butts up against the shoulder.

8. A bicycle, comprising:
a pedal crank,
a traction mechanism drive, and
a drive device, the drive device including:
an electric motor comprising a motor shaft,
a driven shaft for coupling to the traction mechanism drive,
a planetary gear set that drive-connects the motor shaft with the driven shaft,
the planetary gear set including a sun gear that is drive-connected with the motor shaft, at least two planet gears that are in engagement with the sun gear, and an internal gear that is in engagement with the at least two planet gears,
the planetary gear set further including a planet gear carrier, on which the at least two planet gears are rotatably mounted,
wherein the sun gear, the internal gear and the planet gear carrier are rotatably mounted in the planetary gear set about a common axis of rotation, and
the planet gear set further includes a first drive shaft that is provided with a non-rotatable first output gear wheel,
the first output gear wheel is drive-connected with the driven shaft,
the first drive shaft is rotatably mounted about the common axis of rotation via a first output gear wheel bearing arranged radially between a fixed axle pin that extends coaxially to and defines the common axis of rotation and the first output gear wheel, so that the first output gear wheel bearing rotatably mounts the first drive shaft directly on the fixed axle pin,
the first drive shaft includes the planet gear carrier, so that the planet gear carrier is non-rotatably connected to the first output gear wheel, and
a carrier bearing rotatably mounts the first drive shaft via the planet gear carrier about the common axis of rotation on the sun gear, and
wherein the drive device is couplable to the traction mechanism drive.

9. The bicycle according to claim 8,
wherein the sun gear, the internal gear, and the planet gear carrier are at least indirectly rotatably mounted about the common axis of rotation on the fixed axle pin.

10. The bicycle according to claim 9, wherein:
the sun gear is rotatably mounted about the common axis of rotation on the fixed axle pin via at least one sun gear bearing, and
the at least one sun gear bearing mounts the sun gear directly on the fixed axle pin.

11. The bicycle according to claim 8, wherein:
the planetary gear set further includes a second drive shaft that is provided with a second output gear wheel that is non-rotatable and axially offset from the first output gear wheel,
the second output gear wheel is drive-connected with the driven shaft, and the second drive shaft is rotatably mounted about the common axis of rotation via a second output gear wheel bearing arranged between the first drive shaft and the second output gear wheel, so that the second drive shaft is rotatably mounted about the common axis of rotation on the first drive shaft.

12. The bicycle according to claim 11, wherein the second drive shaft includes the internal gear, so that the internal gear is non-rotatably connected to the second output gear wheel.

13. The bicycle according to claim 12, wherein:
the internal gear and the second output gear wheel are structured integrally, and
the second output gear wheel is case-hardened and the internal gear is injection-moulded to the case-hardened second output gear wheel.

14. The bicycle according to claim 12, wherein:
the second output gear wheel comprises a shoulder directed radially inwards, and
the second output gear wheel bearing is received in the second output gear wheel and axially abuts against the shoulder.

15. The bicycle according to claim 11, wherein:
the second output gear wheel comprises a shoulder directed radially inwards, and
the second output gear wheel bearing is received in the second output gear wheel and axially abuts against the shoulder.

16. The bicycle according to claim 11, wherein:
the sun gear is rotatably mounted about the common axis of rotation on the fixed axle pin via at least one sun gear bearing, and
the at least one sun gear bearing mounts the sun gear directly on the fixed axle pin.

17. A drive device for a bicycle, comprising:
an electric motor comprising a motor shaft,
a driven shaft for coupling to a traction mechanism drive,
a planetary gear set that drive-connects the motor shaft with the driven shaft,
the planetary gear set including a sun gear that is drive-connected with the motor shaft, at least two planet gears that are in engagement with the sun gear, and an internal gear that is in engagement with the at least two planet gears,
the planetary gear set further including a planet gear carrier, on which the at least two planet gears are rotatably mounted,
wherein the sun gear, the internal gear and the planet gear carrier are rotatably mounted in the planetary gear set about a common axis of rotation the planetary gear set further comprises a first drive shaft that is provided with a non-rotatable first output gear wheel,
the first output gear wheel is drive-connected with the driven shaft,
the first drive shaft is rotatably mounted about the common axis of rotation via a first output gear wheel bearing arranged radially between a fixed axle pin that extends coaxially to the common axis of rotation and the first output gear wheel, so that the first output gear wheel bearing rotatably mounts the first drive shaft directly on the fixed axle pin,
the planetary gear set further including a second drive shaft that is provided with a second output gear wheel that is non-rotatable and axially offset from the first output gear wheel,
the second output gear wheel is drive-connected with the driven shaft, and the second drive shaft is rotatably mounted about the common axis of rotation via a second output gear wheel bearing arranged radially between the first drive shaft and the second output gear wheel, so that the second drive shaft is rotatably mounted about the common axis of rotation on the first drive shaft.

18. The drive device according to claim 17, wherein the second drive shaft includes the internal gear, so that the internal gear is non-rotatably connected to the second output gear wheel.

19. The drive device according to claim 18, wherein:

the internal gear and the second output gear wheel are structured integrally, and the second output gear wheel is case-hardened and the internal gear is injection-moulded to the case-hardened second output gear wheel.

20. The drive device according to claim 17, wherein:

the second output gear wheel comprises a shoulder directed radially to an inside, and the second output gear wheel bearing is received in the second output gear wheel and axially butts up against the shoulder.

* * * * *